United States Patent [19]

Schofield

[11] 4,151,234
[45] Apr. 24, 1979

[54] PROCESS FOR PREPARATION OF SULFUR NUGGETS FOR STORAGE AND TRANSPORTATION

[75] Inventor: James W. Schofield, Brownsville, Tex.

[73] Assignee: Liquid Terminals, Inc., Brownsville, Tex.

[21] Appl. No.: 793,417

[22] Filed: May 3, 1977

Related U.S. Application Data

[63] Continuation-in-part of Ser. No. 674,051, Apr. 5, 1976, abandoned, and a continuation-in-part of Ser. No. 595,898, Jul. 15, 1975, abandoned.

[51] Int. Cl.$^2$ .............................................. B01J 2/06
[52] U.S. Cl. ...................................................... 264/13
[58] Field of Search .................................... 264/13, 14

[56] References Cited

U.S. PATENT DOCUMENTS

| | | | |
|---|---|---|---|
| 1,378,084 | 5/1921 | Bacon et al. | 264/13 |
| 1,397,099 | 11/1921 | Hill | 264/11 |
| 3,334,159 | 8/1967 | Campbell | 264/13 |

Primary Examiner—Robert F. White
Assistant Examiner—James R. Hall

Attorney, Agent, or Firm—H. Mathews Garland

[57] ABSTRACT

A process for producing solid, irregular shaped sulfur nuggets from molten sulfur. The process includes the steps of: gravity flowing molten sulfur at a temperature preferably in the range of about 240°–270° F. to a distributor head positioned closely above or below the surface of a cooling liquid; discharging the molten sulfur from the distributor head in ribbon-shaped streams into a cooling liquid, preferably water, having a temperature in the range of about 170°–190° F.; passing the molten sulfur streams through the cooling liquid until the streams are subdivided and thereafter solidified into nuggets of irregular shape and size; and removing the solid sulfur nuggets from the cooling liquid. The apparatus in which the process is carried out includes a feed system having temperature control apparatus for maintaining the sulfur in a molten state, a reservoir tank for the cooling liquid, a distributor head having elongated discharge slots for flowing the molten sulfur in ribbon-shaped streams into the cooling liquid, and apparatus such as a conveyor belt in the reservoir tank under the distributor head for collecting and removing the solid sulfur nuggets from the cooling liquid.

14 Claims, 25 Drawing Figures

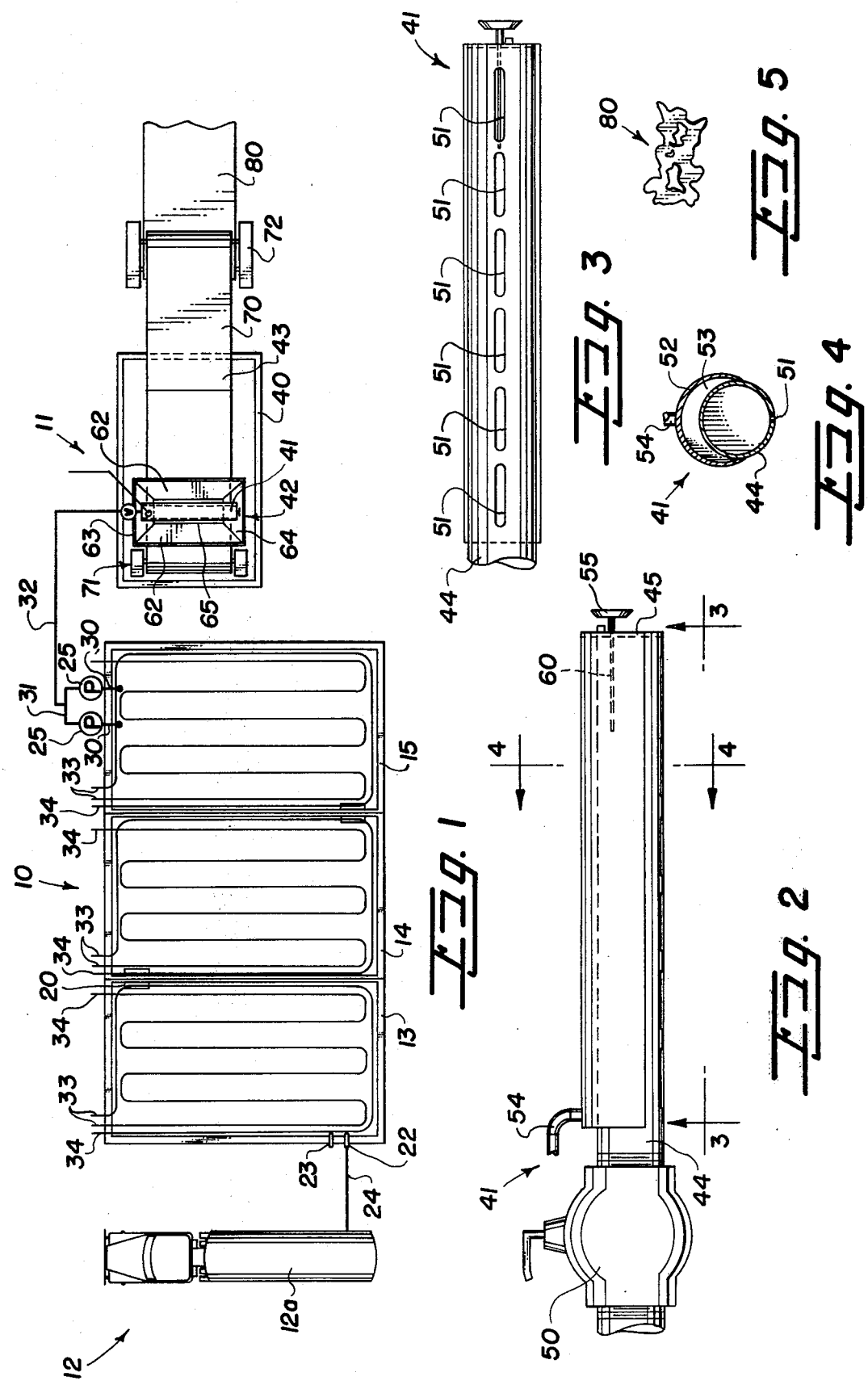

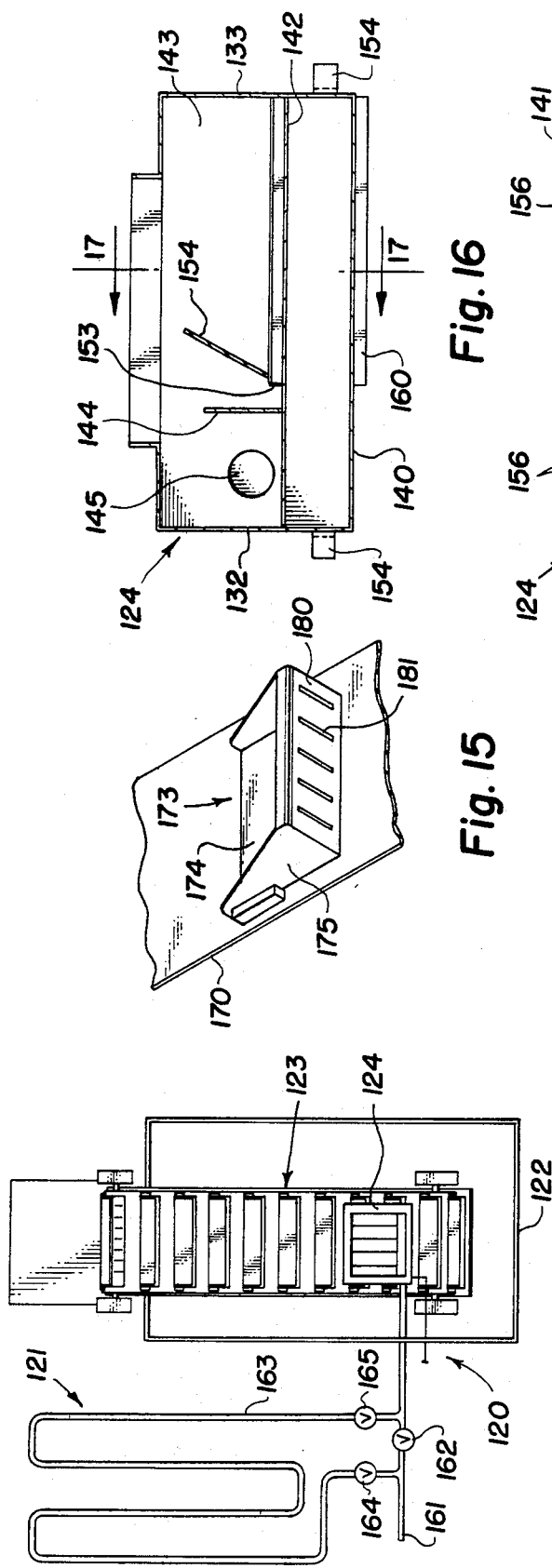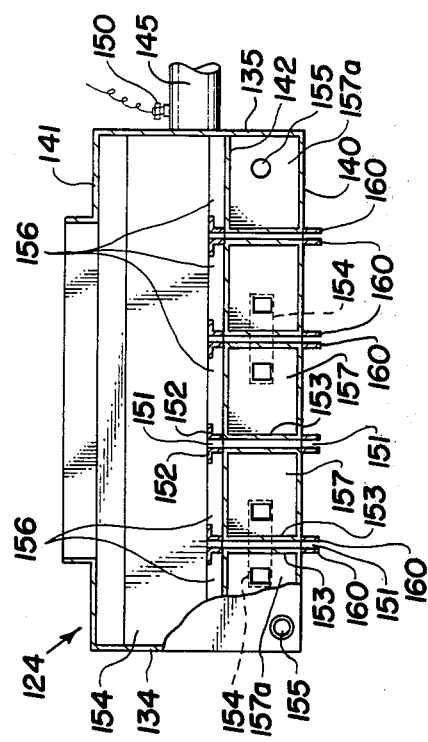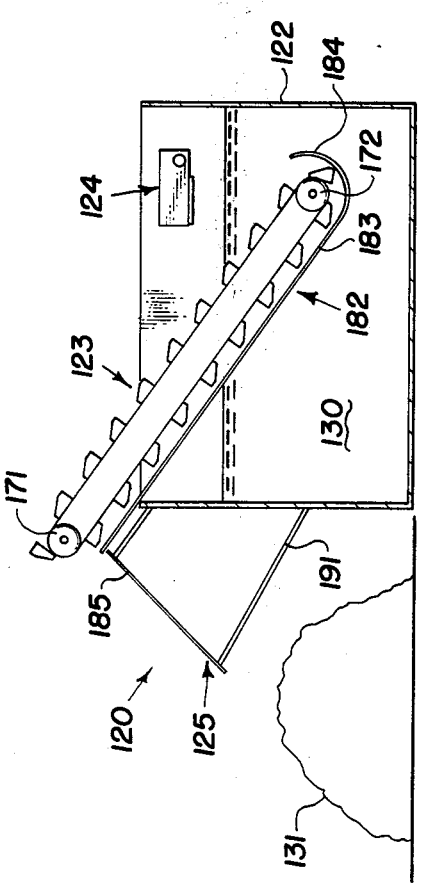

PROCESS FOR PREPARATION OF SULFUR NUGGETS FOR STORAGE AND TRANSPORTATION

This is a continuation-in-part of application Ser. Nos. 595,898 and 674,051 filed by James W. Schofield July 15, 1975, now abandoned and Apr. 5, 1976, now abandoned respectively, both entitled Process and Apparatus for Preparation of Sulfur for Storage and Transportation.

This invention relates to a process for forming molten sulfur into solid sulfur nuggets for storage and handling purposes.

Elemental sulfur is commonly transported in the molten state to a distribution site where it frequently is poured on a surface open to the atmosphere where the sulfur solidifies into slabs of substantial size. These slabs are thereafter mechanically broken up in some manner as by crushing to prepare them for distribution to consumers. This method of handling the sulfur is objectionable for a number of reasons. Among the major problems currently being encountered is pollution of the atmosphere in the vicinity of the processing plant due to the powder or dust formed during the process of crushing the large bodies of sulfur. The process is also undesirable as it requires substantial labor and frequently produces a wide variety of particle sizes, some of which are quite large chunks which are difficult to handle.

A number of solutions have been proposed to the problem of open crushing of the sulfur slabs. Generally such solutions have not produced particles which can be readily handled and often the processes are expensive particularly with respect to the equipment required. Such proposals for forming particles of sulfur from molten sulfur have included agglomeration of atomized sulfur on larger particles in fluid or moving beds, the forming of sulfur balls in a tank of swirling water, and the breakup of low velocity streams of liquid sulfur into uniform droplets. In another proposed method of forming sulfur particles molten sulfur and water are mixed under highly turbulent conditions while discharging the mixture into an unconfined zone in the atmosphere. So far as is presently known none of these proposed methods have found widespread use. It is believed that among the reasons for not generally accepting some of the methods has been the expense of the equipment involved and the expense and labor required in operation of the equipment. A further and principal objection which has been found particularly with those methods which produced sulfur pellets is that the pellets are round and are essentially impossible to stack and handle with any degree of efficiency. Due to the spherical shape of the pellets they tend to readily spread over the storage surface and thus cannot be maintained in any semblance of confined piles. Another problem with available methods for sulfur particle production is excessive moisture content which requires too much heat for remelting and creates a foaming condition.

It is, therefore, a principal object of the present invention to provide a new and improved process for forming molten sulfur into sulfur nuggets which are readily stored and handled.

It is another object of the invention to provide a process for forming molten sulfur into solid nuggets which requires a minimum of steps using relatively inexpensive equipment.

It is another object of the invention to provide a process for forming molten sulfur into solid sulfur nuggets which are irregular in shape permitting storage in piles which have a high angle of repose.

It is another object of the invention to provide a process for producing solid sulfur nuggets from molten sulfur which nuggets resist shattering and powdering.

It is a particularly important object of the invention to provide a process for forming solid sulfur nuggets from molten sulfur wherein the nuggets are formed by discharge of ribbon-shaped streams of molten sulfur into a body of water where the sulfur streams break up and solidify into irregular sulfur nuggets.

It is another object of the invention to provide a process of the character described in which liquid sulfur is discharged through an air space in ribbon-like streams into water.

It is another object of the invention to provide a process of the character described in which the sulfur is discharged in ribbon-like streams under water.

In accordance with the invention, there is provided a process of forming solid sulfur nuggets of irregular shape and size from molten sulfur including the steps of: flowing molten sulfur into a receiving system where the sulfur is maintained at a temperature within a desired range; flowing the molten sulfur from the receiving system into a process unit which includes flowing the sulfur through a distributor head having one or more elongated outlets which form the flowing sulfur into one or more ribbon-shaped streams directed into a body of water within a tank of the processing unit above a discharge conveyor having an input end portion immersed in the water below the discharge of the distribution head; retaining the liquid sulfur in the water until the sulfur breaks up and solidifies into solid nuggets in the water; and withdrawing the nuggets of sulfur from the body of water in the process unit on the discharge conveyor which removes the nuggets to storage or transport facilities. In one embodiment of the invention, the streams of sulfur are passed through an air layer into the water. In another form, the sulfur streams are directed into the water below the surface. Preferably the sulfur is processed at about 240°–270° F. in water in the range of about 170°–190° F.

The foregoing objects and advantages of the invention together with specific details thereof will be better understood from the following detailed description taken in conjunction with the accompanying drawings wherein:

FIG. 1 is a schematic top view in elevation of one form of apparatus for forming sulfur nuggets from molten sulfur in accordance with the invention;

FIG. 2 is a fragmentary enlarged side view in elevation of the distributor head employed in the system of FIG. 1 for discharging flowing molten sulfur ribbon-like streams from the receiving tank into the processing unit of the system;

FIG. 3 is a fragmentary bottom view in elevation of the distributor head as seen along the line 3—3 of FIG. 2;

FIG. 4 is a view in section along the line 4—4 of FIG. 2;

FIG. 5 is a view in elevation of a typical sulfur nugget formed by the process of the invention;

FIG. 13 is a schematic top plan view of another sulfur processing system;

FIG. 14 is a side view in section and elevation illustrating the processing unit of the system of FIG. 13 including the distributor head and conveyor;

FIG. 15 is an enlarged fragmentary view in perspective of a portion of the conveyor belt and one of the conveyor buckets used in the system of FIGS. 13 and 14;

FIG. 16 is a view in section and elevation of the distributor head used in the system of FIGS. 13 and 14;

FIG. 17 is a view in section and elevation of the distributor head shown in FIG. 16 taken along line 17—17 of FIG. 16;

Figure 6:
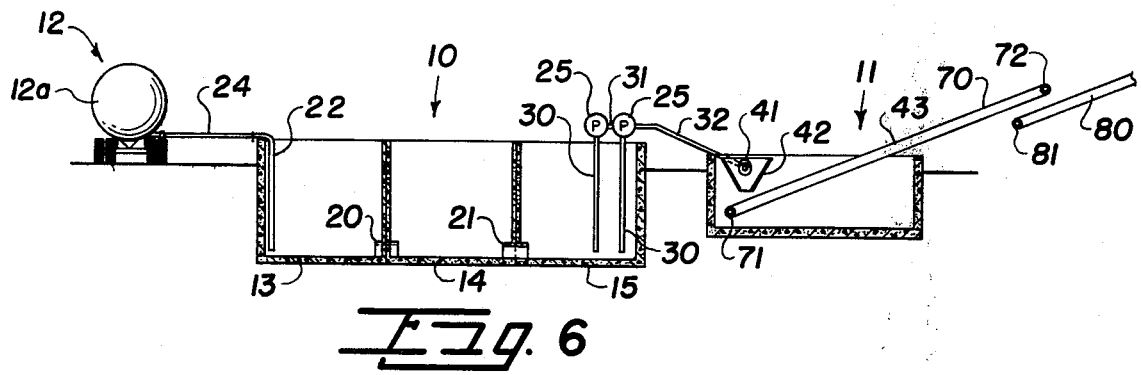
FIG. 6 is a reduced side view in section and elevation showing the apparatus illustrated in FIG. 1.

Referring to FIG. 1 of the drawings, one preferred system for forming sulfur nuggets from molten sulfur in accordance with the invention includes a receiving tank system 10 and a processing unit 11 which are supplied with molten sulfur from a transport truck 12. The receiving tank system includes tanks 13, 14, and 15 in which the temperature of the molten sulfur is controlled to the desired level for discharge into the processing unit 11. The tanks 12 and 14 are interconnected at a low level within the tanks by a weir 20 which permits the molten sulfur to flow from the tank 13 into the tank 14 at a bottom level within both tanks. The tanks 14 and 15 are similarly connected at bottom levels within the tanks by a weir 21 which permits molten sulfur to flow from the tank 14 into the tank 15. Two molten sulfur receiving chutes 22 and 23 are secured along one side of the receiving tank 13 for discharging molten sulfur from the tank 12a of the vehicle 12 into the receiving tank 13. The tank 12a is connected into one of the receiving chutes by means of a supply hose 24. The receiving chute 22 has a lower discharge end opening into the receiving tank 13 at a low level in the tank. The discharge end of the receiving chute 23 opens into an upper portion of the receiving tank 13. Generally the chute 22 opening into the lower portion of the receiving tank 13 is used for flowing molten sulfur which is at a temperature in excess of 280° F. into the receiving tank. That molten sulfur which is at a temperature below 280° F. is normally discharged from the tank vehicle into the receiving tank through the chute 23. A pair of identical pumps 25 are each connected with intake lines 30 which open into the receiving tank 15 for pumping the molten sulfur from the tanks to the processing unit 11. The discharge sides of the pumps 25 are connected with a line 31 which leads to a line 32 running to the processing unit. The bottoms of each of the tanks 13, 14, and 15 are supplied with identical steam coils 33 while similarly the side walls of each of the tanks are provided with steam coils 34 to provide sufficient heat to the bottoms and side walls for maintaining the temperature of the molten sulfur within an acceptable range for supply to the processing unit 11.

The processing unit 11 which forms the molten sulfur into nuggets includes a water tank 40, a molten sulfur distributor head 41, a hopper 42, and a discharge conveyor 43. The distributor head 41, as best seen in FIGS. 2 and 3 is a tubular member 44 closed at one end with a cap 45 and connected at the open opposite end with a valve 50 which is secured with the line 32 from the receiving tank system for controlling flow from the receiving tank system into the distributor head. The lower wall portion of the distributor head pipe 44 is provided with a plurality of spaced, elongated discharge openings 51 which are shaped and sized to discharge molten sulfur into the water tank in substantially flat ribbon-like streams. The upper portion of the distributor pipe 44 is jacketed by a steam hood 52 providing a steam chamber 53 which extends around substantially the upper half of the distributor pipe and is supplied with steam through a line 54 to provide heat to the distributor pipe. It is highly important that a means of supplying heat to the distributor head be provided to insure that the molten sulfur does not solidify in the distributor pipe. The closed end of the distributor pipe 44 is provided with a thermometer 55 having a sensing probe 60 extending through the end plate 45 into the interior of the distributor pipe to provide a continuous visual indication of the temperature of the molten sulfur within the distributor.

The hopper 42 is used to guide the sulfur nuggets onto the end portion of the discharge conveyor 43. The hopper has converging side walls 61 and 62 and end walls 63 and 64. The lower edges of the side and end walls define a bottom opening 65 which is positioned over the discharge conveyor 43. The hopper insures that the sulfur nuggets do not drift around in the water tank but rather are directed to and collected on the discharge conveyor to insure removal of the nuggets from the processing unit water tank.

The discharge conveyor 43 includes a conveyor belt 70 mounted on end roller assemblies 71 and 72. The discharge conveyor is mounted at an angle with the lower end portion of the conveyor at the roller assembly 71 being located within the water tank well below the normal level, not shown, of processing water in the tank. The width of the belt 70 and the end portion of the belt at the lower roller assembly 71 are proportioned and located relative to the opening 65 in the hopper to insure the discharge of all of the sulfur nuggets on the top surface of the belt to substantially insure removal of all of the nuggets from the water tank. The upper end portion of the discharge conveyor is positioned above and in overlapping relationship with a conveyor 80 having a lower roller assembly 81 for movement of the sulfur nuggets to storage or transport facilities, not shown.

It has been found that it is highly critical to produce the desired irregular sulfur nuggets in accordance with the invention that the slot openings 51 and the distributor pipe 44 of the distributor be formed to discharge the molten sulfur in ribbon-shaped streams. By ribbon-shaped it is meant that the streams must have one dimension which is substantially greater than the other dimension to insure the discharge of the flow which is in the shape of a ribbon. Inasmuch as the pure sulfur which is processed in accordance with the invention does not vary in viscosity, it has been found that the dimensional relationships of the slotted openings 51 are rather critical. Satisfactory dimensions which have been found to be effective to produce the desired irregular shaped sulfur nuggets is a slot which is 3/16" wide by 4" long. While the 4" dimension is variable, experiments tend to indicate that the long dimension must be at least ¾" and preferably is greater. The narrow dimension of approximately 3/16", however, has been found to be substantially critical in producing the desired nugget structure. Experimental results with ribbon shapes having a narrow dimension of less than 3/16" have been found to produce spherical-shaped pellets which are not acceptable as are the irregular nuggets formed in accordance with the invention. While a narrow dimension in excess of 3/16" is operable, it produces a ribbon of molten sulfur which has a greater heat capacity requiring an excessive amount of water to reduce the stream to the desired nugget shape and size. It has been found that the most desirable results are obtained by the use of gravity feed through the distributor pipe. Thus, in order to achieve uniform flow through all of the slots, the total area of the slots 51 is no greater than the cross-sectional area of the distributor pipe 44 and preferably is substantially equal to such cross-sectional area. Additionally, the position of the distributor head discharge slots 51 should preferably be within the range of 4" to 6" above the surface of the water in the tank 40 to provide some air cooling and to admit the ribbon-shaped streams into the water while still in a condition which will produce the desired irregular nugget sizes and shapes. If the slots are to high above the water surface, they tend to distort into a stringy form rather than the desired ribbon-shape which produces the irregular nuggets. Also, the higher the sulfur is discharged above the water, the nuggets formed tend to be larger and more porous and light.

Figure 7:
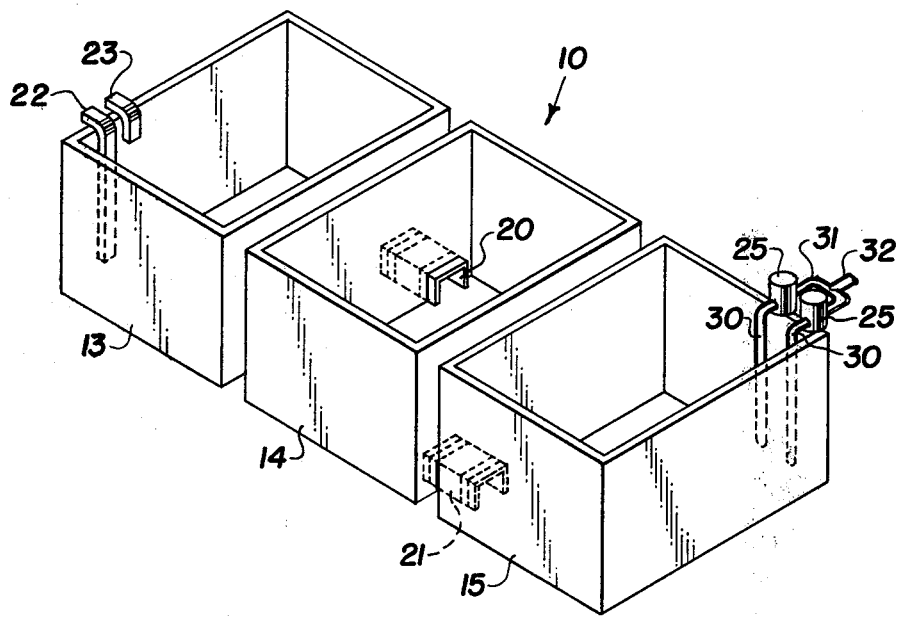
FIG. 7 is a perspective view of the receiving tank system.
Figure 8:
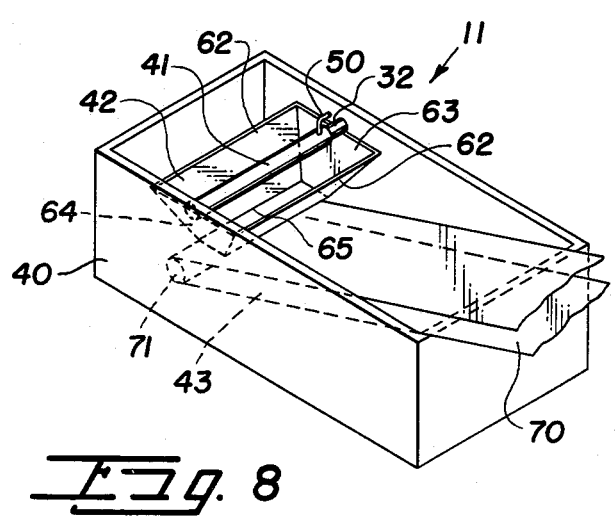
FIG. 8 is a perspective view of the processing unit wherein the sulfur nuggets are formed.

The molten sulfur which is to be processed in accordance with the invention is brought to the site of the processing apparatus in a suitable transport vehicle such as the tank truck 12 illustrated in FIG. 1. The flow line 24 is connected between the discharge of the tank truck and one of the chutes 22 or 23 connected into the first of the receiving tanks 13. If the incoming molten sulfur is at a temperature in excess of 280° F., it is discharged into the tank 13 through the chute 22. If the molten sulfur is below the temperature of 280° F., it is normally discharged into the tank 13 through the chute 23. It will be evident from FIG. 7 that the use of the chute 22 deposits the sulfur initially into the lower portion of the tank 13 while the chute 23 discharges the sulfur into the upper portion of the tank. By means of the heating coils 33 and 34 in the bottom and walls of the tank 13, the tank is controlled at a minimum temperature of about 270° F. The sulfur discharged into the tank 13 is allowed to cool in the tank but is not permitted to drop below the temperature of about 270° F. The sulfur flows from the receiving tank 13 through the weir 20 into the receiving tank 14 and from the tank 14 into the receiving tank 15 through the weir 21. The tank 14 is preferably maintained at a temperature of no less than 260° F. while the tank 15 is held at a minimum of about 240° F. Since the three tanks communicate through the open weirs 20 and 21, the molten sulfur will flow into and fill the three tanks to equal levels dependent upon the volume of the tanks and the volume of the transport tank 12a. The receiving tank system basically serves the function of cooling the sulfur to the desired temperature of no less than about 240° F. and further provides a reserve capacity which allows more flexibility in accommodating numbers and sizes of incoming transport vehicles while allowing a continuous supply of molten sulfur to the processing unit 11.

The control of the temperature of the molten sulfur prior to discharge through the slots 51 in the distributor head 41 is quite critical in view of the fact that the molten sulfur solidifies almost instantly at a temperature below about 234° F. to 240° F. In other words, it does not go through a hardening stage at which it is still somewhat soft and pourable and during which it is readily reversible. Thus at the temperature at which the molten sulfur solidifies there is almost an instant conversion from the normal liquid form of the sulfur into a solid form. Thus the equipment in the system must be operated in a manner to insure that the sulfur does not solidify. Solidification would present a major problem in the process and would normally require completely shutting down the system until the parts in which the solidification occurs were replaced or the sulfur was reheated and remelted. It is therefore preferable that the sulfur in the tank 15 be maintained within the range of 240° to 260° F. for supply to the distributor head 41 in the processing unit 11.

The molten sulfur in the receiving tank 15 while being maintained in the temperature range of 240°-260° F. is drawn from the tank by the pumps 25 through the intake line 30.

The molten sulfur is discharged by the pumps 25 into the line 31 connecting with the line 32 at a rate and pressure which will essentially permit the molten sulfur to flow by gravity through the line 32 into the distributor pipe 44 through the valve 50. As previously stated, the distributor pipe 44 is supported at a position within the hopper 42 at about 4"–6" above the surface of water in the processing tank 40. The water level in the tank and the position of the discharge conveyor 43 are adjusted to position the belt 70 below the discharge end 65 of the hopper so that the water surface is about 13" above the belt.

The water temperature for production of a product which is commercially acceptable for most purposes is quite critical. Such a product should not have a water content in excess of 1% when cooled and ready for storage and shipping. A water content of even as much as 1%–2% has been found excessive because such particles require too much heat to remelt and also a foaming condition develops which is undesirable during remelting.

The molten sulfur is discharged through the openings 51 in the distributor head pipe 44 by gravity feed in flat ribbon-shaped streams. The temperature of the sulfur in the distributor is monitored by the thermometer 55. Steam is introduced in the line 54 to the jacket space 53 to ensure that the sulfur remains above the critical temperature at which it solidifies. A discharge temperature of about 240°–270° F. is preferred, though a temperature as high as 285° F. will produce a product satisfactory for some purposes. The streams of molten sulfur remain in the flat ribbon-like form until each stream enters water in the processing tank 40. The streams of molten sulfur disintegrate as they drop downwardly in the water and harden into nuggets of irregular shape and size which resembly popped popcorn such as the nugget 80 illustrated in FIG. 5. These streams completely fragment or distintegrate and solidify into the described nuggets between entry into the water at the surface and deposit of the nuggets on the conveyor belt below the discharge opening of the hopper. The hopper confines the downward movement of the nuggets to a pattern through the discharge opening 65 which ensures the deposit of all of the nuggets on the surface of the discharge conveyor belt.

The nuggets harden sufficiently on the surface to present a shiny enamel-like surface crust which prevents the nuggets from sticking to each other and maintains their irregular configuration. In a typical test run, nugget size ranged from large nuggets approximately 1" long by ½" in width to small nuggets approximately ¼" long by ⅛" to ⅜" width.

Figure 9:
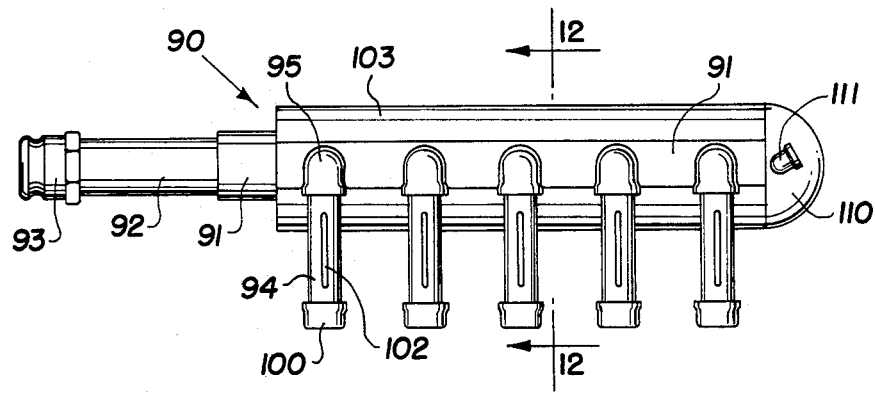
FIG. 9 is a bottom view of another form of distributor head which may be used in the system illustrated in FIG. 1.
Figure 10:
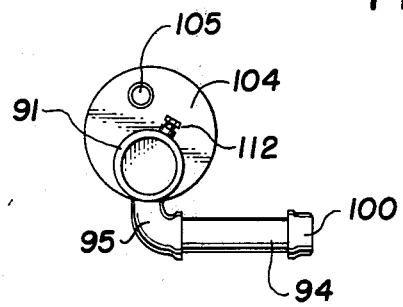
FIG. 10 is a left end view of the distributor head of FIG. 9.
Figure 11:
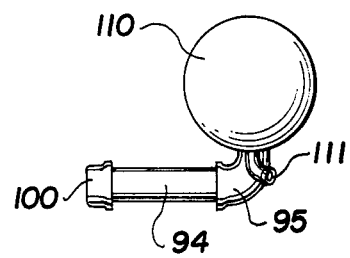
FIG. 11 is a right end view of the distributor head of FIG. 9.
Figure 12:
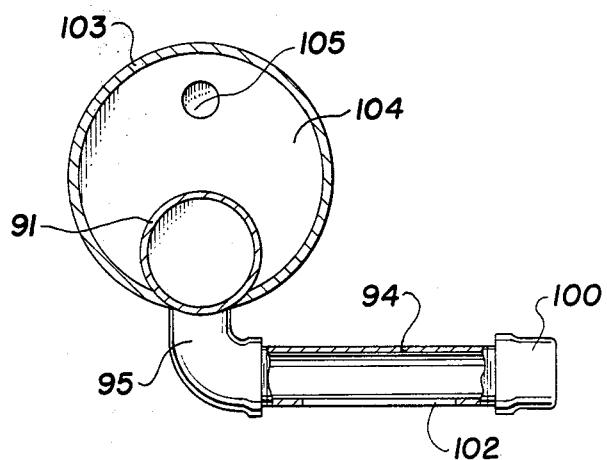
FIG. 12 is an enlarged view in section and elevation of the distributor head of FIG. 9 as seen along the line 12—12 of FIG. 9.

FIGS. 9–12 illustrate another distributor head 90 which may be used in the sulfur processing system illustrated in FIGS. 1–8 for introducing the sulfur into the processing water in the reservoir tank. The head 90 includes a tubular body 91 which is closed at one end, the right end as viewed in FIG. 9, and at the other end is secured with a pipe section 92 provided with a coupling 93 which is connectible with a source of liquid sulfur supply such as the line 32 for supplying liquid sulfur to the distributor head. A plurality of discharge nozzles 94 are secured in parallel relation spaced along the length of the body section 91. Each of the nozzles is connected by an elbow 95 with the body 91 to conduct liquid sulfur from the body into the nozzle. The outward free end of each nozzle is closed by a cap 100. Each nozzle has an elongated slot 102 for discharging the sulfur from the nozzle into the water. The body 91 of the head is jacketed by a housing 103 which is eccentrically positioned in spaced relation around the body section 91 and closed at opposite ends to provide a chamber for steam used for preventing solidification of the liquid sulfur within the distributor head body. The left end of the housing as seen in FIG. 9 is closed by a plate 104 provided with an opening 105 for a steam connection. The right end of the housing is closed by a semispherical cap 110 provided with downwardly extending elbow connection 111 for steam flow. Thus, steam may be introduced into one end of the housing and flow out the opposite end for providing steam heating around the head body 91. A thermometer well fitting 112 is connected into the top of the body 91 which projects from the housing 103 as seen in FIG. 10 for receiving a thermometer to monitor the temperature of the liquid sulfur in the body of the head.

The distributor head 90 functions in exactly the same way as the head 41 for discharging liquid sulfur into the water in the reservoir tank. The ribbon-like streams of sulfur are, of course, parallel with the direction of movement of the belt rather than perpendicular to such movement as with the head 41. Functionally, the head 90 will provide the same end result; and due to the geometry of the discharge slots 102, a larger volume of sulfur may be handled with the head 90.

FIGS. 13 and 14 illustrate another sulfur processing system 120 for practicing the invention. The system 120 includes a cooling pipe maze 121, a reservoir tank 122, a conveyor system 123, a distributor head 124, and a delivery chute 125. The reservoir tank 122 holds a body of water 130 into which the head 124 discharges liquid sulfur for formation of sulfur nuggets which are removed from the water by the conveyor system 123 and dropped onto the delivery chute 125 down which the nuggets slide to form a storage pile 131 of the solid sulfur nuggets.

The distributor head 124 is a rectangular box-shaped unit having opposite ends 132 and 133, opposite sides 134 and 135, and a bottom 140. The head 124 has an internal floor 142 spaced above the bottom 140 which defines the bottom of an upper flow chamber portion 143 through which the liquid sulfur flows for discharge into the water 130. The upper chamber portion 143 has a transverse dam 144 which extends the full width of the unit between the side walls 134 and 135 and is connected along the bottom edge to the floor 132. The portion of the upper chamber 143 to the left of the dam 144 as seen in FIG. 16 is supplied with liquid sulfur through an inlet pipe 145 which is provided with a temperature sensing well 150. The floor 142 has elongated parallel-spaced slots 151 which run a portion of the length of the floor on the side of the dam 144 opposite the inlet 145 as seen in FIG. 16. A pair of parallel-spaced angle members 152 is secured on the floor 142 along each slot 151 from the end 133 the length of each of the slots toward the dam 144. The open ends of the member 152 end adjacent to the dam 144 between each pair of the angle members 152 is closed by a plate 153 as seen in FIG. 16. A transverse sloping baffle 154 is secured between the side walls 134 and 135 across the end portions of the angle member 152 adjacent to the dam 144. With such construction, the flow pattern of the liquid sulfur flowing into the unit through the inlet pipe 145 is into the upper chamber portion to the left of the dam 144, and over the dam 144 into the space between the dam and the baffle. The sulfur then flows along the top surface of the floor 142 under the baffle into the channels 156 defined between adjacent pairs of the flanges. When the level of the sulfur spilling over dam 144 and flowing under the baffle rises sufficiently above the flange members 152, the sulfur spills over the flange members into the space between the closely-spaced, adjacent flange members into the elongated slots 151, flowing downwardly between flange members as can be understood from FIG. 17. The baffle 154 functions as a secondary dam to trap a portion of the flowing sulfur between the dam 144 and the baffle 154 limiting the flow pattern of this sulfur to the space between the flange members below the baffle. This produces a better distribution and more even flow of the sulfur along the length of the slots 151 rather than having a larger portion of the sulfur flow into the slots at the end of the slots near the dam 144.

The lower portion of the head 124 is compartmentized as seen in FIG. 17 with longitudinal internal dividers 153 separating the lower portion into closed internal compartments 157 and outside compartments 157a. The dividers 153 also define the sulfur discharge slots 151 through the lower compartmentized portion of the head. U-shaped flow ducts 154 interconnect corresponding ends of adjacent compartments while the outside compartments 157a are provided with steam connections 155 for flowing steam into and out of the series of interconnected compartments. Such compartmentized lower portion of the head provides substantial flow space for steam which keeps the upper reservoir space 143 of the head heated and keeps the slots 151 hot so that the liquid sulfur may be prevented from solidifying within the distributor head 124. To assist in clearly defining the discharged ribbons of liquid sulfur from the head 124, sets of spaced, parallel flanges 160 are secured in longitudinally spaced relation from the bottom 140 on opposite sides of the discharge slots 151.

The pipe maze 121 includes a supply line 161 provided with a main control valve 162 and a serpentine-shaped branch line 163 which include valves 164 and 165. With valves 164 and 165 closed and valve 162 open, liquid sulfur may flow directly through the line 161 into the distributor head 124. With the valve 162 closed and valves 164 and 165 open, the sulfur is diverted through the section 163 which is used at times when the stored sulfur is at too high a temperature to go directly into the distributor head. Additional sections of the pipe maze may be provided with appropriate valves to allow for the selection of one or more such sections depending upon how many are needed for the necessary cooling of the sulfur.

The conveyor 123 as shown in FIG. 14 includes a belt 170 which travels on spaced end rollers 171 and 172. Mounted in spaced relation along the outer face of the belt 170 are a plurality of buckets 173 for collecting and removing sulfur particles from the water 130. Each of the buckets has a bottom 174, triangular-shaped opposite side walls 175, and an end 180 provided with spaced drain slots 181. The conveyor operates in a trough 182 having a bottom 183 and a curved lower end portion 184. The trough and conveyor belt-bucket assembly are assembled in closely spaced relation so that the buckets move closely along the inner surface of the trough to maximize the clearing out of the sulfur nuggets formed in the water from the liquid sulfur dropped by the head 124 into the water downwardly to the conveyor system. The delivery chute assembly 125 includes a chute 185 mounted on brackets 190 and 191 along the outside end face of the tank 122 at the upper discharge end of the conveyor 123.

The conveyor 123 moves in a counter-clockwise direction as seen in FIG. 14 so that the buckets each move upwardly as viewed in FIG. 15 collecting the sulfur nuggets as they sweep around within the lower end 184 of the trough gathering the nuggets along the bottom and end of the trough as well as the nuggets dropping through the water from the sulfur discharged by the head 124. The water entrained in the buckets as they move upwardly drains back into the reservoir tank through the slots 181. As the drained buckets of nuggets reach the upper end of the conveyor system, the buckets move over and downwardly to inverted position at which the nuggets are dumped downwardly to the chute surface 185 along which the sulfur nuggets slide to the ground surface to form the storage pile 131 as seen in FIG. 14.

Figure 18:
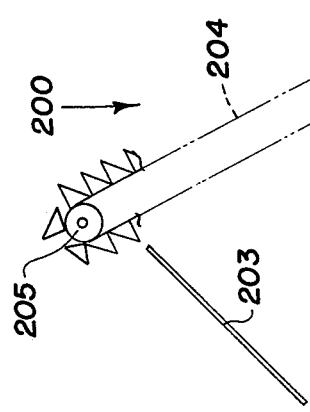
FIG. 18 is a side view in section and elevation, partially broken away, of a reservoir tank and a conveyor which may be used in sulfur processing systems for practicing the invention.

Another sulfur processing system 200 is schematically illustrated in FIG. 18. The system 200 includes a conveyor 201, a reservoir tank 202, and a delivery slide 203. The conveyor has a belt 204 running on end rollers 205 and 210 and is provided with spaced buckets 211 which are of a construction similar to the buckets illustrated in FIG. 15. The reservoir tank 202 is closely fitted along the bottom and lower end of the conveyor so that the conveyor will continually remove the sulfur nuggets as they are formed in the reservoir tank lifting them and discharging them on the slide 203. The system 200 is useful with only one of the distributor heads disclosed herein.

Figure 19:
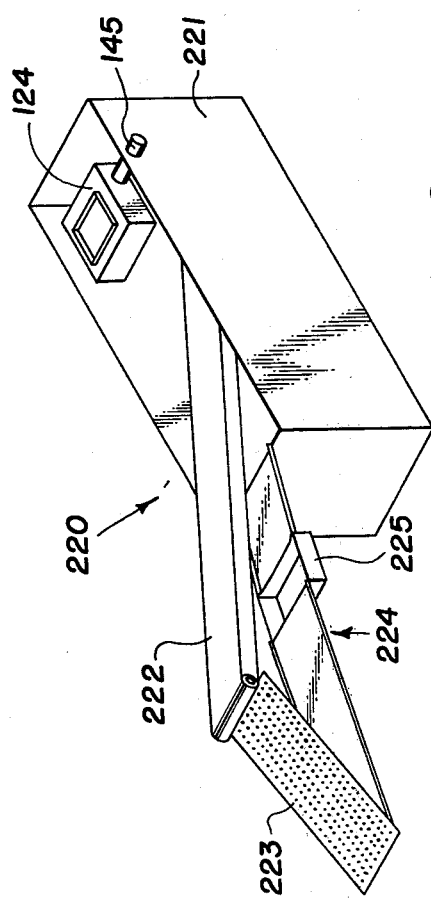
FIG. 19 is a perspective view of another form of a sulfur processing system showing a reservoir tank and conveyor assembly together with a distributor head of the type illustrated in FIGS. 16 and 17.

FIG. 19 illustrates a sulfur recovery system 220 which includes a reservoir tank 221, a conveyor 222, a discharge slide 223, a recirculation trough 224, and a distributor head 124 of the type illustrated in FIGS. 16 and 17. The conveyor 222 is of conventional construction resembling the form of conveyor illustrated in FIG. 6. The discharge slide 223 is perforated to that water carried from the reservoir tank by the sulfur nuggets will drain through the perforations in the slide dropping to the return trough 224. The return trough includes a settling pan 225 through which the recirculating water flows and in which the water slows down sufficiently that any fine particles carried over from the reservoir tank on the conveyor 222 along with the sulfur nuggets will settle out and periodically can be removed. The water flows from the pan 225 along the trough back into the reservoir 221 for continued use thereby conserving on water usage. Otherwise, the system 220 functions in the same way as the other systems described.

Figure 20:
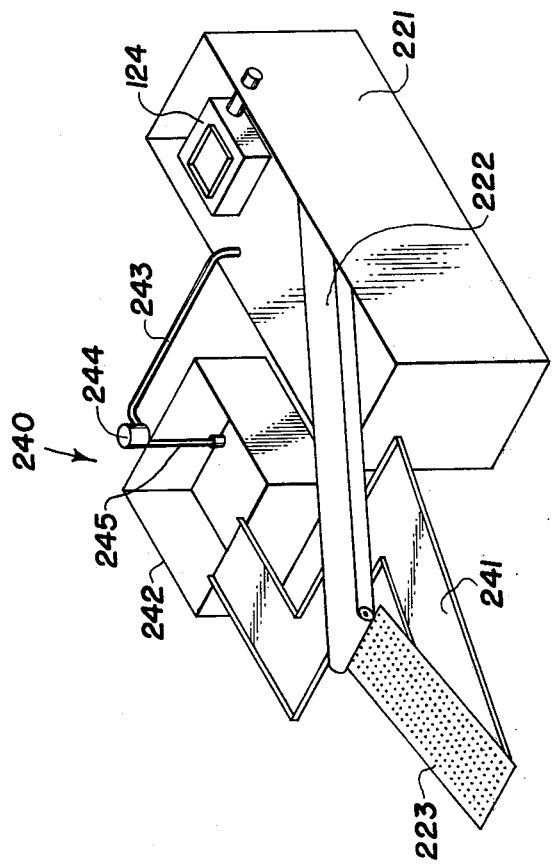
FIG. 20 is a schematic view in perspective of still another form of sulfur processing system using the distributor head of FIGS. 16 and 17.

FIG. 20 schematically illustrates a still further form of sulfur processing system 240 which resembles the system 220 except for a variation in the drain water recirculation system. The system 240 has a reservoir tank 221, a conveyor 222, a perforated discharge slide 223, and the distributor head 124. A recirculating trough 241 is positioned under the perforated slide 223 leading to a settling tank 242 in which carried-over fine particles settle out from the recirculating water. The water is then returned through a conductor 243 by means of a pump 244 having an intake 245 in the settling tank. The water is discharged back into the reservoir tank 221 for reuse in producing the desired sulfur nuggets. With the exception of a design variation in the recirculating apparatus of the system 240, the system otherwise functions in a manner identical to the other systems disclosed herein. It will be apparent that from time to time fine settled products will have to be manually removed from the settling tank 242.

Figure 21:
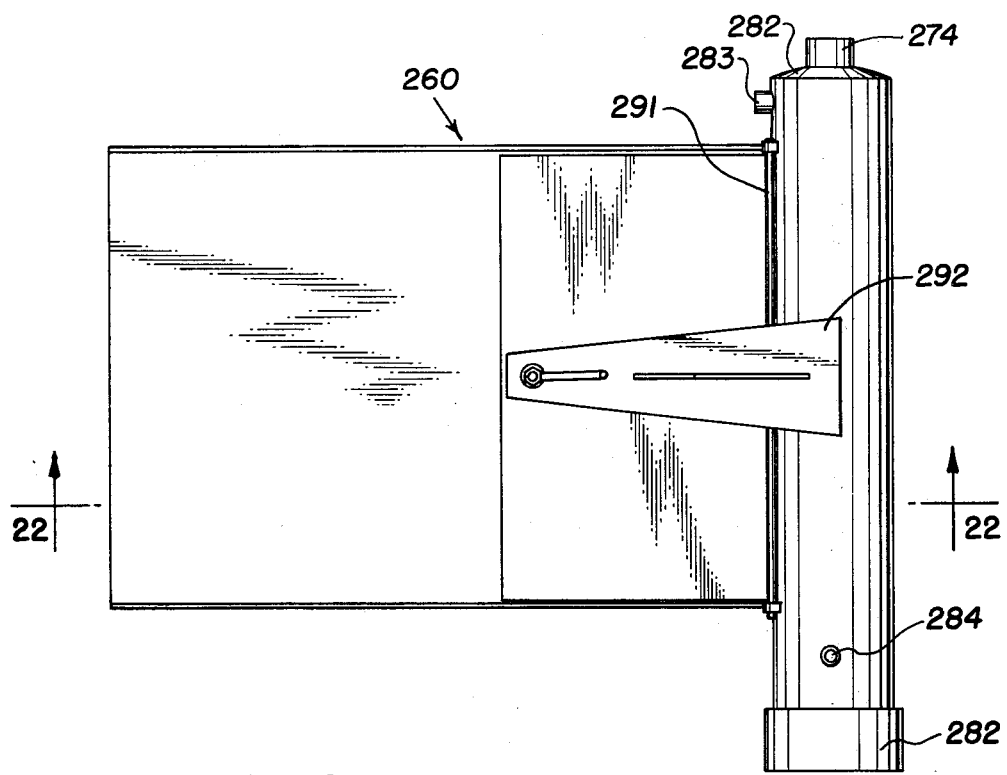
FIG. 21 is a top plan view of another type of distributor head which may be used in various forms of apparatus for practicing the process.
Figure 22:
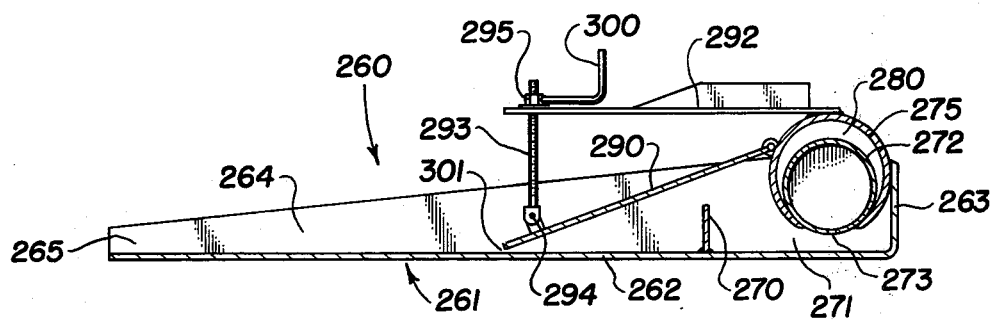
FIG. 22 is a side view in section and elevation of the distributor head of FIG. 21 taken along the line 22—22 of FIG. 21.

FIGS. 21 and 22 show a distributor head 260 which is usable in any one of the several sulfur processing systems described herein. The head 260 has a discharge trough 261 provided with a bottom 262, an end closure 263, and opposite side walls 264. The trough has an open discharge end 265 through which liquid sulfur spills into the reservoir tank of the system in which it is installed. A transverse dam 270 is secured between the side walls 264 spaced from the end 263 to define a surge chamber 271 within the trough to attenuate flow variations into the trough to provide smoother discharge. A tubular fluid supply section 272 provided with a downwardly opening discharge slot 273 is secured transversely of the trough within the surge chamber 271 to supply liquid sulfur into the trough. The section 272 has a fitting 274 for coupling with a supply pipe. An eccentrically positioned jacket 275 is secured in spaced relation around the section 272 defining a heating chamber 280 around a major portion of the supply section for steam used to prevent solidification of the liquid sulfur. Opposite end closure members 281 and 282 close the ends of the supply section 272 of the jacket 275. Flow connections 283 and 284 are connected into the jacket 275 to permit steam to flow through the heating chamber 280 of the jacket around the supply section 272 to maintain a sufficiently high temperature to prevent the sulfur from solidifying in the head. An adjustable baffle 290 is secured across the trough on a hinge pin 291 connected along the jacket 275. The baffle 290 is adjustably suspended from a bracket 292 by a threaded support rod 293 which is pivotally pinned at 294 with the free end of the baffle and threads through a nut 295 above the bracket 292. An adjusting handle 300 is connected on the nut 295. The baffle 290 is supported over the dam 270, and the free end edge of the baffle serves to define with the top surface of the trough bottom an adjustable discharge opening 301 through which liquid sulfur flows along the trough to the discharge end portion 265 of the trough.

The distributor head 260 spills a wide sheet or ribbon of liquid sulfur into the reservoir tank of the particular system in which the head is installed. The liquid sulfur flows through the fitting 274 of the head into the interior of the supply section 272. The sulfur is discharged downwardly through the slot 273 into the dammed chamber 271. When the level of the sulfur rises above the dam, it spills over the dam toward the outward end of the trough. The sulfur flows along the top surface of the trough bottom 262, under the baffle 290, through the opening 301 defined between the trough bottom and the baffle end edge, and spills off the end 265. The edge of the baffle not only provides an adjustable opening for the sulfur flow but also tends to smooth out surges in the sulfur flow. Similarly, of course, the use of the dam 270 serves to eliminate surges to some extent. The sulfur drops into the water reservoir in a sheet form where it separates and solidifies into irregular nuggets having a glazed hard surface.

Figure 23:
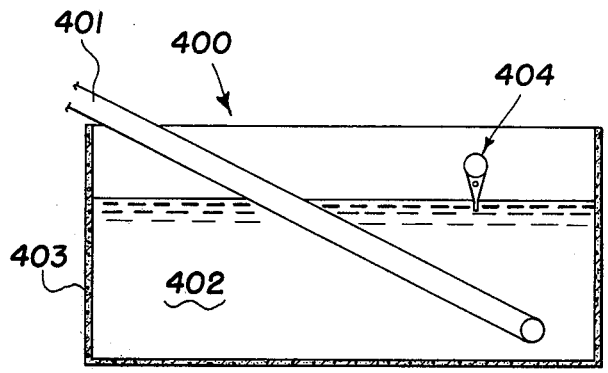
FIG. 23 is a schematic side view in section and elevation of a still further form of sulfur processing system.
Figure 24:
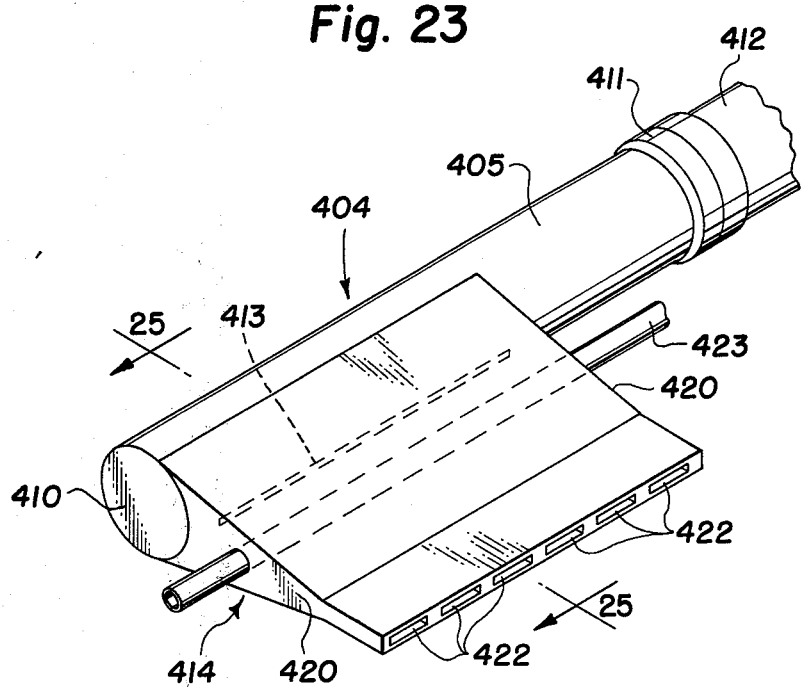
FIG. 24 is an enlarged fragmentary view in perspective showing the distributor head employed in the system of FIG. 23.
Figure 25:
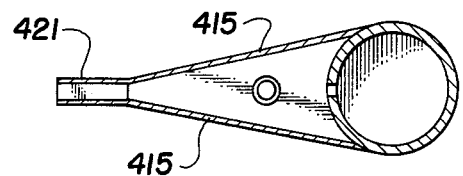
FIG. 25 is a view in section along the line 25—25 of the distributor head of FIG. 24.

A still further form 400 of a sulfur processing system for practicing the invention is schematically illustrated in FIG. 23. The system 400 includes a belt conveyor 401 having a lower end immersed in the body of water 402 contained in a reservoir tank 403. A distributor head 404 is supported for discharging liquid sulfur into the water to form sulfur nuggets in accordance with the features of the invention. The system 400 is particularly distinguished from the other systems disclosed in that the distributor head 404 discharges ribbon-like streams of sulfur into the water body 402 below the surface of the water.

The distributor head 404 has a tubular body 405 which is closed at a free end 410 and connected by a rotatable fluid coupling 411 to a supply conduit 412 leading from sulfur storage facilities, not shown. The body 405 has an elongated bottom discharge slot 413 which opens into a throat section 414 formed by converging slide panels 415 and opposite end panels 420. The small outward end of the throat section connects with a rectangular discharge nozzle portion 421 provided with a plurality of longitudinally spaced, rectangular discharge slots 422. A steam flow pipe 423 is connected through the end panels 420 disposed in a central transverse position across the throat section 414 to provide a central source of heat from steam directed through the pipe for insuring that the liquid sulfur within the discharge head is kept at a sufficiently elevated temperature to preclude solidification of the sulfur.

In a typical installation of the system 400, the supply pipe 412 and the tubular distributor body 415 are formed of 3" pipe. The slot 413 opening into the throat section 414 is typically formed to have about 7 square inches in cross-sectional area while the discharge nozzle slots 422 are typically $\frac{1}{4}$" wide and 3" long providing a total cross-sectional discharge slot area of $4\frac{1}{4}$". The distributor head 414 is supported above the water surface with the discharge nozzle slots 422 approximately 2" below the water surface. The discharge slots are preferably approximately 30" to 40" above the lower end portion of the conveyor belt 410. The sulfur nuggets are formed by the ribbon-like streams of liquid sulfur discharged into the water. The fall of approximately 30" to 40" in the water before striking the belt surface is required for separation of the sulfur streams and solidification of the nuggets. The rotatable coupling 411 permits the distributor head to be revolved relative to the supply pipe 412 so that the direction of discharge and the height of discharge may be varied. Thus, the head is readily located at a height which permits the discharge openings 422 to be selectively placed at a plurality of positions ranging from a location above the water to below the water surface as shown in FIG. 23. The system is preferably operated at a water temperature of 170°–190° F. The sulfur is desirable introduced into the water at a temperature of about 240° to 270° F. The discharge of the ribbon-like sulfur streams into the water below the surface of the water tends to produce larger, more dense sulfur nuggets with less entrained water and a somewhat harder, glazed-like outer surface after the nuggets have been removed and dried. By utilizing a larger slot 413 in the body 415 than the total area of the discharge slots 422 to supply liquid sulfur to the discharge nozzle portion of the head 404, the throat and discharge nozzle portions are kept liquid full minimizing the probability of entraining air with the sulfur; and, thus, insuring that the discharge nozzle slots 422 are liquid full at all times during operation.

In each of the sulfur processing systems described, the sulfur nuggets formed in the water reservoir are discharged in the atmosphere along a delivery slide to either storage facilitates or transportation vehicles. In accordance with the invention, the irregular configuration and the size of the nuggets permits them to be stacked in piles either outside or within enclosures such as buildings or transportation vehicles. The glazed surface finish strongly resists fragmentation and powdering so that the pellets are handled without dust in the atmosphere which is a very severe limitation on currently available methods of handling solid sulfur. Even though the outer surface of the nuggets is hard and glazed, the irregular shape of the nuggets permits piles of them to have a very high angle of repose so that they may be stacked high without freely spreading out over the supporting surface. The nuggets may, thus, be thereafter picked up by such devices as front end loaders without an undue amount of labor and with little loss of the sulfur. Another principal feature and benefit achieved by the system and method of invention is nuggets which do not require further grinding or crushing for normal storage and handling so that they eliminate some of the steps which are presently necessary for processing the large chunks which result from solidifying large volumes of sulfur. Not only is atmospheric pollution minimized; but also, since it is not necessary to crush the large volumes of sulfur in either chunks or sheets, a fair degree of noise pollution is also eliminated. one particular feature of all of the various systems which have been described herein is the capability of flowing the liquid sulfur at a minimum of head pressure in a steady, controlled manner through discharge openings which produce ribbon-like streams. It has been found that discharge under any more than very minimum pressure will not produce the desired usable heavy product. Turbulence is not desirable within the discharge flow pattern of the distributor heads.

What is claimed is:

1. A process for producing solid nuggets of sulfur having irregular shapes and sizes, comprising:
    (a) flowing molten sulfur at a temperature in the range of about 240°–270° F. to a distributor head having discharge opening means;
    (b) discharging said molten sulfur from said distributor head through said opening means into a cooling liquid in a continuous ribbon-shaped stream having a width substantially greater than the thickness thereof;
    (c) retaining said sulfur stream in said ribbon-shape until said stream enters said cooling liquid;
    (d) passing said sulfur stream through said cooling liquid while maintaining the temperature of said cooling liquid in the range of about 170°–190° F. until said sulfur stream is subdivided and cooled to a solidified condition as nuggets of irregular shape and size having a moisture content not exceeding about 1%; and
    (e) removing said nuggets from said cooling liquid.

2. A process in accordance with claim 1 wherein said sulfur stream is discharged from said opening means above the surface of said cooling liquid.

3. A process in accordance with claim 2 wherein said sulfur stream is no less than about 3/16 inch thick and no less than about ¾ inch wide.

4. A process in accordance with claim 1 wherein said sulfur stream is discharged from said opening means below the surface of said cooling liquid.

5. A process in accordance with claim 4 wherein said sulfur stream is no less than about 3/16 inch thick and no less than about ¾ inch wide.

6. A process in accordance with claim 1 wherein said cooling liquid is water.

7. A process in accordance with claim 6 wherein said sulfur stream is no less than about 3/16 inch thick and no less than about ¾ inch wide.

8. A process in accordance with claim 6 wherein said sulfur stream is discharged through said opening means above the surface of said water.

9. A process in accordance with claim 8 wherein said sulfur stream is no less than about 3/16 inch thick and no less than about ¾ inch wide.

10. A process in accordance with claim 6 wherein said sulfur stream is discharged through said opening means below the surface of said water.

11. A process in accordance with claim 10 wherein said sulfur stream is no less than about 3/16 inch thick and no less than about ¾ inch wide.

12. A process for producing solid nuggets of sulfur having irregular shapes and sizes, comprising:
    (a) gravity flowing molten sulfur under minimum pressure at a temperature in the range of about 240°–270° F. to a distributor head having discharge opening means;
    (b) discharging said molten sulfur from said distributor head opening means into a body of cooling water in a continuous ribbon-shaped stream having a thickness of no less than about 3/16 inch and a width of no less than about ¾ inch;
    (c) maintaining said stream in said ribbon-shape until said stream enters said cooling water;
    (d) passing said stream through said cooling water while maintaining the temperature of said cooling water within the range of about 170°–190° F. and minimizing turbulence within the flow pattern of said stream in said cooling water until said stream is subdivided and cooled to a solidified condition as nuggets of irregular shape and size having a moisture content no greater than about 1%; and
    (e) removing said nuggets from said cooling water.

13. A process in accordance with claim 12 wherein said continuous ribbon-shaped stream of molten sulfur is discharged through said opening means at a height above the surface of said cooling water no greater than about 4 inches.

14. A process in accordance with claim 12 wherein said continuous ribbon-shaped stream of molten sulfur is discharged through said opening means into said cooling water below the surface of said water.

* * * * *